United States Patent
Shimizu

(10) Patent No.: US 9,678,934 B2
(45) Date of Patent: Jun. 13, 2017

(54) ELECTRONIC DEVICE AND TOUCH PANEL OPERATION METHOD

(71) Applicant: KYOCERA Document Solutions Inc., Osaka (JP)

(72) Inventor: Takeo Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 49 days.

(21) Appl. No.: 14/851,992

(22) Filed: Sep. 11, 2015

(65) Prior Publication Data
US 2016/0077657 A1    Mar. 17, 2016

(30) Foreign Application Priority Data
Sep. 16, 2014   (JP) ................................ 2014-187666

(51) Int. Cl.
| G06F 3/0488 | (2013.01) |
| G06F 17/24 | (2006.01) |
| G06F 3/0482 | (2013.01) |
| G06F 3/0481 | (2013.01) |

(52) U.S. Cl.
CPC ............ *G06F 17/24* (2013.01); *G06F 3/0482* (2013.01); *G06F 3/0488* (2013.01); *G06F 3/04817* (2013.01); *G06F 3/04883* (2013.01)

(58) Field of Classification Search
None
See application file for complete search history.

(56) References Cited

U.S. PATENT DOCUMENTS

| 5,689,718 A | * | 11/1997 | Sakurai | ............... G06F 3/04817 715/205 |
| 5,745,910 A | * | 4/1998 | Piersol | ................... G06F 17/22 715/210 |
| 5,812,862 A | * | 9/1998 | Smith | ..................... G06F 17/22 715/209 |

(Continued)

FOREIGN PATENT DOCUMENTS

| JP | 2001-356878 A | 12/2001 |
| JP | 2004-126679 A | 4/2004 |
| JP | 2013-218521 A | 10/2013 |

OTHER PUBLICATIONS

An Office Action; "Notice of Reasons for Rejection," issued by the Japanese Patent Office on Jul. 5, 2016, which corresponds to Japanese Patent Application No. 2014-187666 and is related to U.S. Appl. No. 14/851,992.

*Primary Examiner* — Carolyn R Edwards
*Assistant Examiner* — Bipin Gyawali
(74) *Attorney, Agent, or Firm* — Studebaker & Brackett PC

(57) ABSTRACT

A control section of an image forming apparatus includes a pinch-in detection section, a copy processing section, a pinch-out detection section, and a paste processing section. The pinch-in detection section detects a pinch-in operation performed on an object displayed on a touch panel. When the pinch-in operation is detected, the copy processing section copies the object or a character string included in the object. The pinch-out detection section detects a pinch-out operation performed on the touch panel. When the pinch-out operation is detected, the paste processing section pastes the object or the character string included in the object at a position at which the pinch-out operation is detected.

12 Claims, 9 Drawing Sheets

(56) References Cited

U.S. PATENT DOCUMENTS

| | | | |
|---|---|---|---|
| 5,897,647 A * | 4/1999 | Kadosawa | G06F 17/24 |
| | | | 715/210 |
| 7,289,120 B2 | 10/2007 | Fukaya | |
| 8,964,252 B2 | 2/2015 | Fujimoto | |
| 2004/0223002 A1 | 11/2004 | Fukaya et al. | |
| 2007/0188496 A1 | 8/2007 | Igusa | |
| 2013/0265596 A1 | 10/2013 | Fujimoto | |
| 2014/0152591 A1 * | 6/2014 | Odakura | G06F 3/04883 |
| | | | 345/173 |

\* cited by examiner

ELECTRONIC DEVICE AND TOUCH PANEL OPERATION METHOD

INCORPORATION BY REFERENCE

The present application claims priority under 35 U.S.C. §119 to Japanese Patent Application No. 2014-187666, filed on Sep. 16, 2014. The contents of this application are incorporated herein by reference in their entirety.

BACKGROUND

The present disclosure relates to electronic devices including touch panels and touch panel operation methods.

In order to move an object (for example, an icon) displayed on a touch panel to a different position, it is necessary to use a finger to perform a drag operation to a target destination position on the screen while touching the object. Such a drag operation can be problematic because in a situation in which the finger detaches from the screen during the drag operation, the object is moved to the position at which the finger detaches.

An icon control method that uses two-point simultaneous touching has for example been disclosed in order to combat the above problem. The aforementioned icon control method moves icons according to the procedure described below. First, a target icon that is to be moved is placed in a selected state by simultaneous touching of two points in proximity to the target icon. Next, the target icon is recognized to be in a drag state through removal of the touching described above. Finally, the target icon is taken out of the drag state and moved to a destination position as a result of simultaneous touching of two points that indicate the destination position.

The icon control method described above recognizes the drag state through detachment of fingers from the panel. Therefore, it is not necessary to slide a finger on the panel and there is no need to repeat an operation due to a finger becoming detached from the panel during the operation.

SUMMARY

A first electronic device according to the present disclosure includes a touch panel, a pinch-in detection section, a copy processing section, a pinch-out detection section, and a paste processing section. The pinch-in detection section detects a pinch-in operation performed by a user on an object displayed on the touch panel. When the pinch-in operation is detected by the pinch-in detection section, the copy processing section copies the object or a character string included in the object. The pinch-out detection section detects a pinch-out operation performed by the user on the touch panel. When the pinch-out operation is detected by the pinch-out detection section, the paste processing section pastes the object or the character string, copied by the copy processing section, at a position at which the pinch-out operation is detected.

A second electronic device according to the present disclosure includes a touch panel, a pinch-in detection section, a cut processing section, a pinch-out detection section, and a paste processing section. The pinch-in detection section detects a pinch-in operation performed by a user on an object displayed on the touch panel. When the pinch-in operation is detected by the pinch-in detection section, the cut processing section cuts the object or a character string included in the object. The pinch-out detection section detects a pinch-out operation performed by the user on the touch panel. When the pinch-out operation is detected by the pinch-out detection section, the paste processing section pastes the object or the character string, cut by the cut processing section, at a position at which the pinch-out operation is detected.

An operation method for a touch panel according to the present disclosure includes first detecting a pinch-in operation performed by a user on an object displayed on the touch panel. When the pinch-in operation is detected, the object or a character string included in the object is copied. Next, a pinch-out operation performed by the user on the touch panel is detected. When the pinch-out operation is detected, the copied object or the copied character string is pasted at a position at which the pinch-out operation is detected.

BRIEF DESCRIPTION OF THE DRAWINGS

FIGS. 7A and 7B illustrate examples of a pinch-out operation shown in Step S115 of FIG. 3, wherein FIG. 7A illustrates an example in which the pinch-out operation is for performing paste processing of a label object and FIG. 7B illustrates an example in which the pinch-out operation is for performing paste processing of a button object.

FIGS. 8A, 8B, and 8C illustrate examples of a pinch-out operation shown in Step S119 of FIG. 4, wherein FIG. 8A illustrates an example in which the pinch-out operation is for performing paste processing of a label object, FIG. 8B illustrates an example in which the pinch-out operation is for performing paste processing of text in a label object, and FIG. 8C illustrates an example in which the pinch-out operation is for performing paste processing of text in a button object.

FIGS. 9A and 9B illustrate other examples of the pinch-out operation shown in Step S115 of FIG. 3, wherein FIG. 9A illustrates an example of a fast pinch-out operation for performing paste processing of an icon object and FIG. 9B illustrates an example of a slow pinch-out operation for performing paste processing of an icon object.

DETAILED DESCRIPTION

Figure 1:
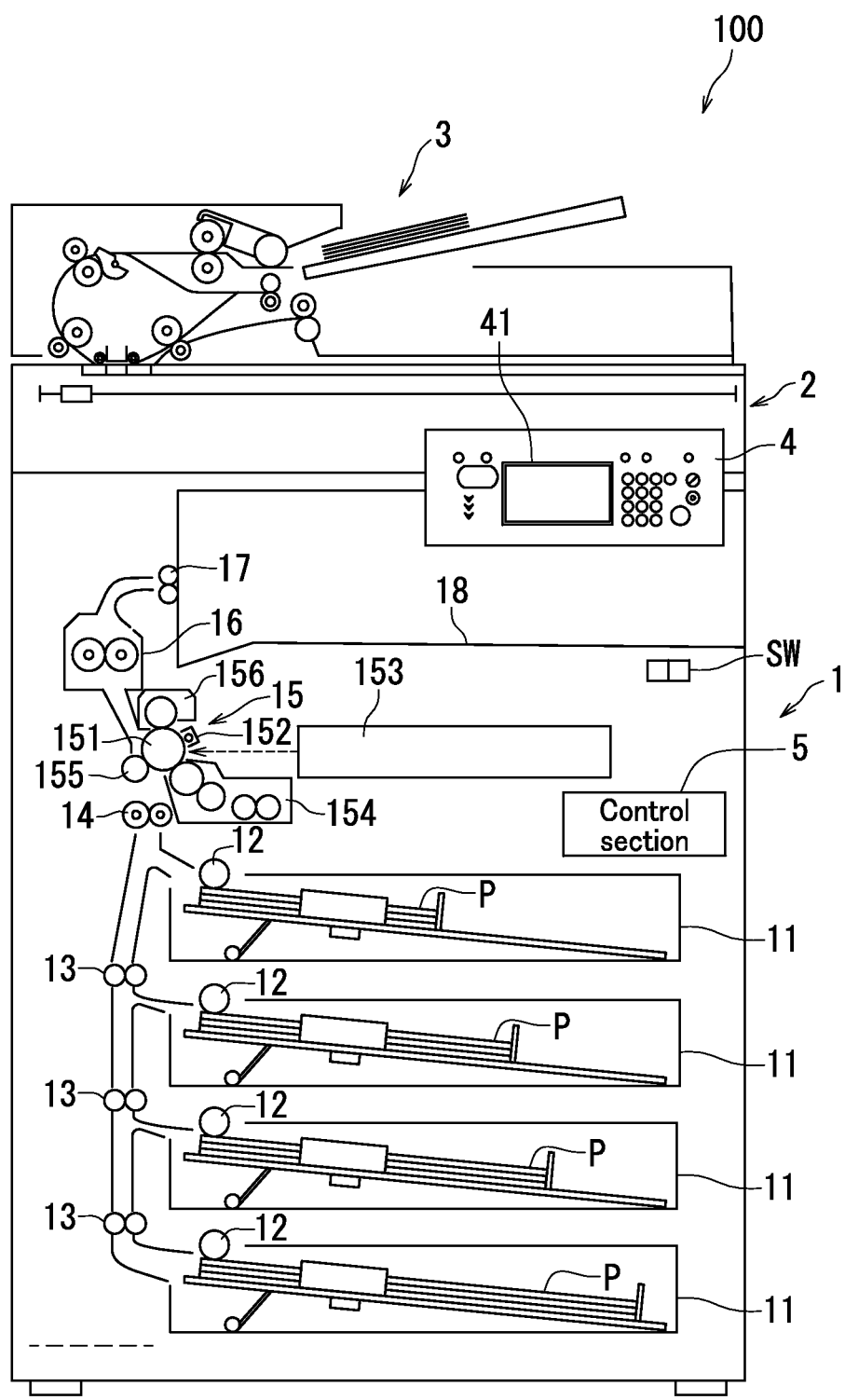
FIG. 1 illustrates configuration of an image forming apparatus according to an embodiment of the present disclosure.

The following explains an embodiment of the present disclosure with reference to the drawings (FIGS. 1 to 9B). Elements in the drawings that are the same or equivalent are marked using the same reference signs and explanation thereof is not repeated.

The following first explains an image forming apparatus 100 according to the present embodiment with reference to FIG. 1. FIG. 1 illustrates configuration of the image forming apparatus 100 according to the present embodiment. The image forming apparatus 100 is a multifunction peripheral in the present embodiment. The image forming apparatus 100 functions as a scanner, a copier, a printer, and a facsimile machine. The image forming apparatus 100 includes an image forming unit 1, an image scanning unit 2, a document conveying unit 3, an operation panel 4, a control section 5, and a power switch SW. It should be noted that the image forming apparatus 100 is equivalent to an example of an electronic device.

The image forming unit 1 forms an image on recording paper P. The image scanning unit 2 scans an image formed on a document. The document conveying unit 3 conveys a document that is a target for scanning. The operation panel 4 includes a touch panel 41 and receives operations from a user for the image forming apparatus 100. The control section 5 controls overall operation of the image forming apparatus 100. Configuration of the control section 5 is explained further below with reference to FIG. 2. The power switch SW is a switch for switching power of the image forming apparatus 100 on and off.

The image forming unit 1 includes paper feed cassettes 11, pickup rollers 12, pairs of conveyance rollers 13, a pair of registration rollers 14, an image forming section 15, a fixing device 16, a pair of ejection rollers 17, and an exit tray 18. Each of the pickup rollers 12 picks up recording paper P, one sheet at a time, from a corresponding one of the paper feed cassettes 11. Recording paper P picked up by the pickup rollers 12 is conveyed to the image forming section 15 by the pairs of conveyance rollers 13 and the pair of registration rollers 14.

The image forming section 15 forms an image on recording paper P that is conveyed from the paper feed cassettes 11. The image forming section 15 includes a photosensitive drum 151, a charger 152, a light exposure section 153, a development section 154, a transfer roller 155, and a cleaning section 156. The photosensitive drum 151 is a circular tube-shaped rotary member that has a circumferential surface on which an electrostatic latent image is formed. The charger 152 charges the photosensitive drum 151 to a specific electrical potential. The light exposure section 153 forms an electrostatic latent image corresponding to image data on the photosensitive drum 151 by emitting laser light based on the image data and exposing the photosensitive drum 151. The image data may for example be image data that has been generated by the image scanning unit 2 scanning a document or image data that has been received from an external computer via a communication network (not illustrated).

The development section 154 develops the electrostatic latent image formed on the photosensitive drum 151 by supplying toner and, as a result, forms a toner image on the photosensitive drum 151. The transfer roller 155 transfers the toner image from the photosensitive drum 151 to the recording paper P. The cleaning section 156 removes residual toner remaining on the photosensitive drum 151 after transfer. Once an image has been formed on the recording paper P by the image forming section 15, the recording paper P is conveyed to the fixing device 16.

The fixing device 16 thermally fixes the image formed on the recording paper P to the recording paper P. The fixing device 16 includes a pressure roller and a heating roller having an internal heating element. The heating roller and the pressure roller press against one another to form a fixing nip. Toner attached to the surface of the recording paper P is heated and melted as the recording paper P passes through the fixing nip, thereby fixing the toner image to the recording paper P. Once the toner image has been fixed to the recording paper P, the recording paper P is ejected onto the exit tray 18 by the pair of ejection rollers 17.

The control section 5 includes a central processing unit (CPU), read only memory (ROM), random access memory (RAM), and rewritable non-volatile memory. The ROM stores a control program. The CPU implements various functional sections by reading and executing the control program stored in the ROM. The CPU uses the RAM as a work area during execution of the control program. The non-volatile memory is for example flash memory or electrically erasable programmable read-only memory (EEPROM), and for example stores screen information for display on the touch panel 41.

Figure 2:
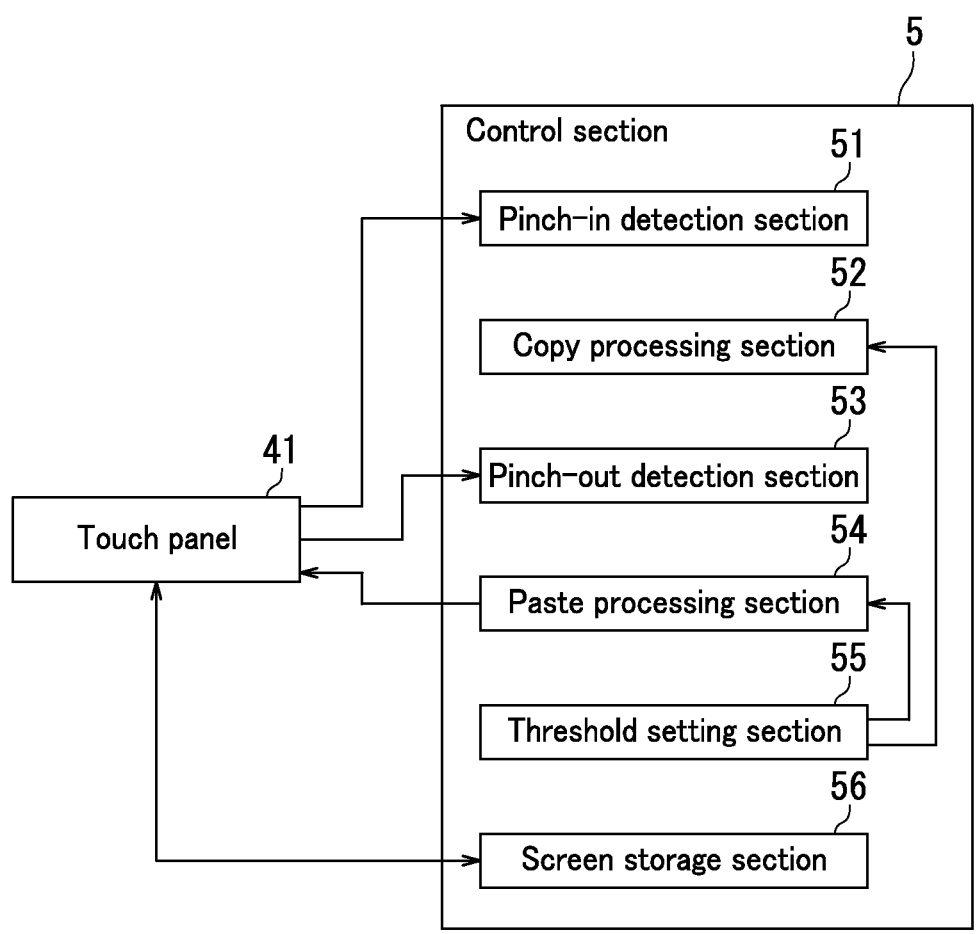
FIG. 2 is a block diagram illustrating functional configuration of a control section shown in FIG. 1.

The following explains configuration of the control section 5 with reference to FIG. 2. FIG. 2 is a block diagram illustrating configuration of the control section shown in FIG. 1. As illustrated in FIG. 2, the control section 5 implements various functional sections including a pinch-in detection section 51, a copy processing section 52, a pinch-out detection section 53, a paste processing section 54, and a threshold setting section 55 through the CPU reading and executing the control program stored in the ROM. In addition, through the CPU reading and executing the control program stored in the ROM, the non-volatile memory functions as a screen storage section 56.

The screen storage section 56 stores screen information displayed on the touch panel 41. The screen information displayed on the touch panel 41 can be changed by placing the touch panel 41 in an editing state. Changed screen information can be recorded in the screen storage section 56 through a certain operation of the touch panel 41.

The pinch-in detection section 51 detects a pinch-in operation performed by a user on an object BJ displayed on the touch panel 41. The term "object" is used herein to refer to an elements displayed on the touch panel 41 for operation and guidance. In the present embodiment, an object may be a button, an icon, or a label. Furthermore, an object may include a character string TX. For example, in the case of an object that is a copy button, the object is a button that includes a character string "Copy". The copy button is touched in order to instruct performance of a copy operation.

The pinch-in detection section 51 also detects a type of the object BJ that is targeted by the pinch-in operation. In the present embodiment, there are three types of objects BJ: icons, buttons, and labels. The object BJ targeted by the pinch-in operation is for example an object BJ that includes at least part of a line segment joining two points touched by a user when initiating the pinch-in operation. The two points referred to above are two points on the touch panel 41 that are touched by two fingers of the user. In a situation in which there is more than one object BJ that at least partially includes the aforementioned line segment, the target of the pinch-in operation is for example determined to be an object BJ including a longest length of the line segment.

The pinch-in detection section 51 also detects a pinch-in time TN indicating a length of time from initiation of the pinch-in operation until completion of the pinch-in operation. Initiation of the pinch-in operation refers to a timing at which the user touches the touch panel 41 using two fingers and starts to move the two fingers toward one another. Completion of the pinch-in operation refers to a timing at which the user stops moving the two fingers toward one another and detaches at least one of the fingers from the touch panel 41.

When the pinch-in operation is detected by the pinch-in detection section 51, the copy processing section 52 copies the object BJ that is targeted by the pinch-in operation or a character string TX included in the object BJ.

The copy processing section 52 determines a copying target based on the type of the object BJ detected by the pinch-in detection section 51. More specifically, the copy processing section 52 determines that the copying target is the object BJ in a situation in which the type of the object BJ is an icon and determines that the copying target is the object BJ or the character string TX included in the object BJ in a situation in which the type of the object BJ is not an icon (i.e., when the type is a label or a button in the present embodiment).

Such a configuration can improve usability because the copying target is determined based on the type of the object BJ. More specifically, in a situation in which the type of the object BJ is an icon, the user does not need to select a copying target because the copy processing section 52 determines that the copying target is the object BJ. On the other hand, in a situation in which the type of the object is not an icon (i.e., when the type is a label or a button in the present embodiment), the user is able to select a copying target because the copying target is determined to be the object BJ or the character string TX included in the object BJ.

The copy processing section 52 also determines the copying target based on the pinch-in time TN. More specifically, the copy processing section 52 copies the object BJ in a situation in which the type of the object BJ is a label or a button and the pinch-in time TN is shorter than or equal to a preset first threshold time TH1 (1 second in the present embodiment). On the other hand, the copy processing section 52 copies the character string TX included in the object BJ in a situation in which the type of the object BJ is not an icon (i.e., when the type is a label or a button) and the pinch-in time TN is longer than the first threshold time TH1.

Such a configuration can improve usability because the copying target can be determined based on the pinch-in time TN. More specifically, the user can copy the object BJ by making the pinch-in time TN short (i.e., by performing a fast pinch-in operation). Furthermore, the user can copy the character string TX included in the object BJ by making the pinch-in time TN long (i.e., by performing a slow pinch-in operation).

The pinch-out detection section 53 detects a pinch-out operation performed by the user on the touch panel 41. The pinch-out detection section 53 also detects a pinch-out time TU indicating a length of time from initiation of the pinch-out operation until completion of the pinch-out operation. Initiation of the pinch-out operation refers to a timing at which the user touches the touch panel 41 using two fingers and starts to move the two fingers away from one another. Completion of the pinch-out operation refers to a timing at which the user stops moving the two fingers away from one another and detaches at least one of the fingers from the touch panel 41.

When the pinch-out operation is detected by the pinch-out detection section 53, the paste processing section 54 pastes the object BJ or the character string TX included in the object, which has been copied by the copy processing section 52, at a position at which the pinch-out operation is detected.

The paste processing section 54 determines a pasting target based on the type of the object BJ. More specifically, the paste processing section 54 determines that the pasting target is the object BJ in a situation in which the type of the object BJ is an icon. On the other hand, the paste processing section 54 determines that the pasting target is the object BJ or the character string TX included in the object BJ in a situation in which the type of the object BJ is not an icon (i.e., when the type is a button or a label in the present embodiment).

The paste processing section 54 also determines the pasting target based on the pinch-out time TU. More specifically, in a state in which the character string TX included in the object BJ has been copied by the copy processing section 52, the paste processing section 54 for example generates and pastes an object BJ (a label in the present embodiment) that includes the character string TX in a situation in which the pinch-out time TU is shorter than or equal to a preset second threshold time TH2 (1 second in the present embodiment). On the other hand, in the state in which the character string TX included in the object BJ has been copied by the copy processing section 52, the paste processing section 54 pastes the character string TX in a situation in which the pinch-out time TU is longer than the second threshold time TH2. In a state in which the object BJ has been copied by the copy processing section 52, the paste processing section 54 pastes the object BJ irrespective of the pinch-out time TU.

Such a configuration can improve usability because the pasting target can be determined based on the pinch-out time TU. More specifically, in the state in which the character string TX included in the object BJ has been copied, the user can generate and paste an object BJ including the character string TX by making the pinch-out time TU short (i.e., by performing a fast pinch-out operation). Furthermore, in the state in which the character string TX included in the object BJ has been copied, the user can paste the character string TX by making the pinch-out time TU long (i.e., by performing a slow pinch-out operation).

The present embodiment is explained using an example in which, in the state in which the object BJ has been copied by the copy processing section 52, the paste processing section 54 pastes the object BJ irrespective of the pinch-out time TU. However, in an alternative example, the paste processing section 54 may determine a pasting target based on the pinch-out time TU in the aforementioned state. In such an alternative example, in the state in which the object BJ has been copied by the copy processing section 52, the paste processing section 54 may paste the object BJ in a situation in which the pinch-out time TU is shorter than or equal to the preset second threshold time TH2 and may paste the character string TX included in the object BJ in a situation in which the pinch-out time TU is longer than the second threshold time TH2. Such a configuration can improve usability.

Although the present embodiment is explained for an example in which, in the state in which the character string TX has been copied, the paste processing section 54 generates and pastes a label including the character string TX in a situation in which the pinch-out time TU is shorter than or equal to the second threshold time TH2, the above example is not a limitation. In an alternative example, the paste processing section 54 may generate and paste a button including the character string TX. In another alternative example, the user may select the type of object BJ that is generated by the paste processing section 54. Such a configuration can improve usability.

The threshold setting section 55 receives input from the user and sets the first threshold time TH1 and the second threshold time TH2. The above configuration can improve usability because the user can set preferred times for the first threshold time TH1 and the second threshold time TH2.

Although the present embodiment is explained for an example in which the threshold setting section 55 receives input from the user and sets both the first threshold time TH1 and the second threshold time TH2, in an alternative example, the threshold setting section 55 may receive input from the user and set either the first threshold time TH1 or the second threshold time TH2.

Although the present embodiment is explained for an example in which, for convenience, the first threshold time TH1 is 1 second, the user preferably sets a preferred time for the first threshold time TH1 through the threshold setting section 55. For example, a user who performs operations quickly should set a short time for the first threshold time TH1 (for example, 0.5 seconds) and a user who performs operations slowly should set a long time for the first threshold time TH1 (for example, 2 seconds).

Likewise, although the present embodiment is explained for an example in which, for convenience, the second threshold time TH2 is 1 second, the user preferably sets a preferred time for the second threshold time TH2 through the threshold setting section 55. For example, a user who performs operations quickly should set a short time for the second threshold time TH2 (for example, 0.5 seconds) and a user who performs operations slowly should set a long time for the second threshold time TH2 (for example, 2 seconds).

Figure 3:
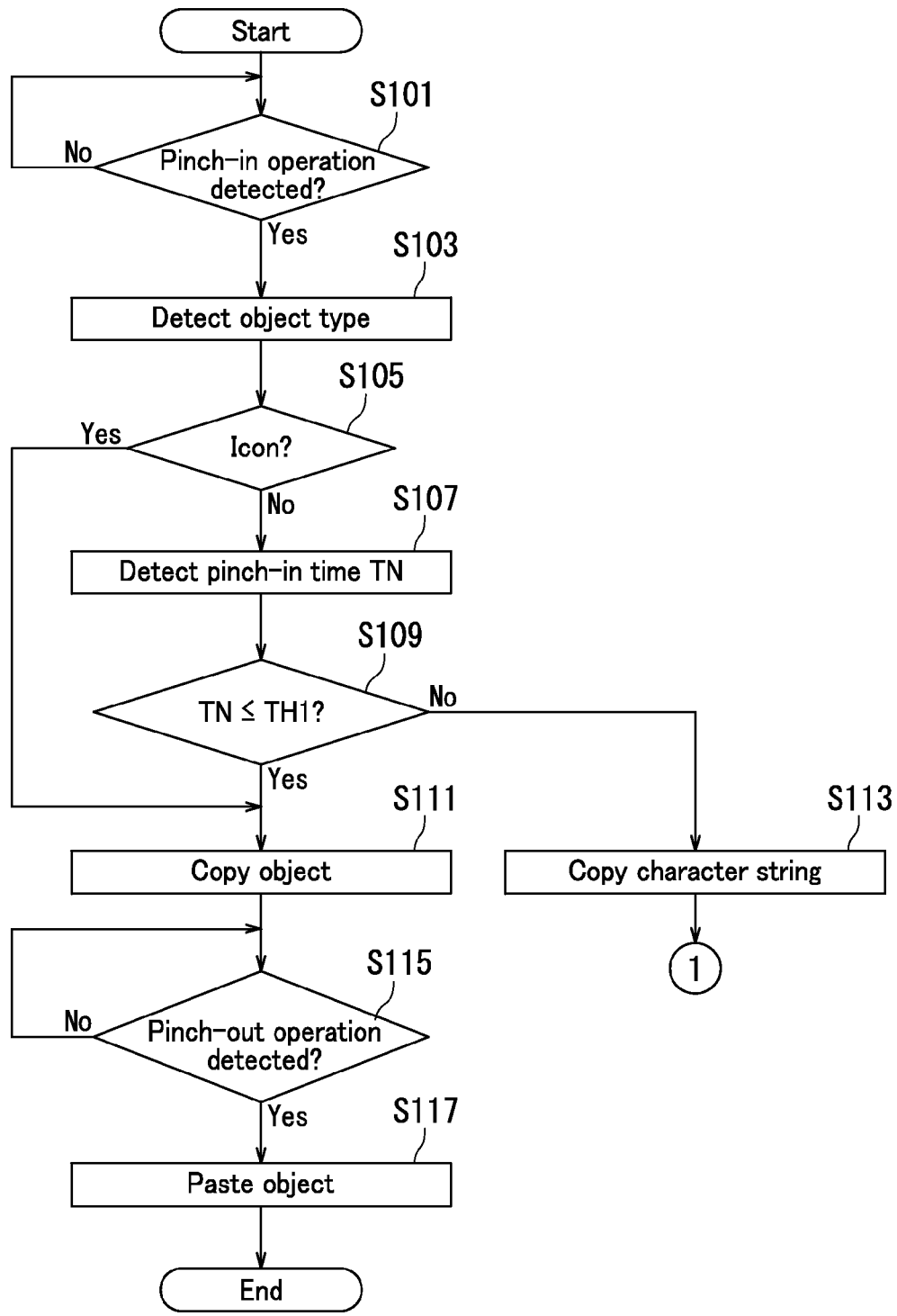
FIG. 3 is a flowchart (first half) illustrating operation of the control section shown in FIG. 2.
Figure 4:
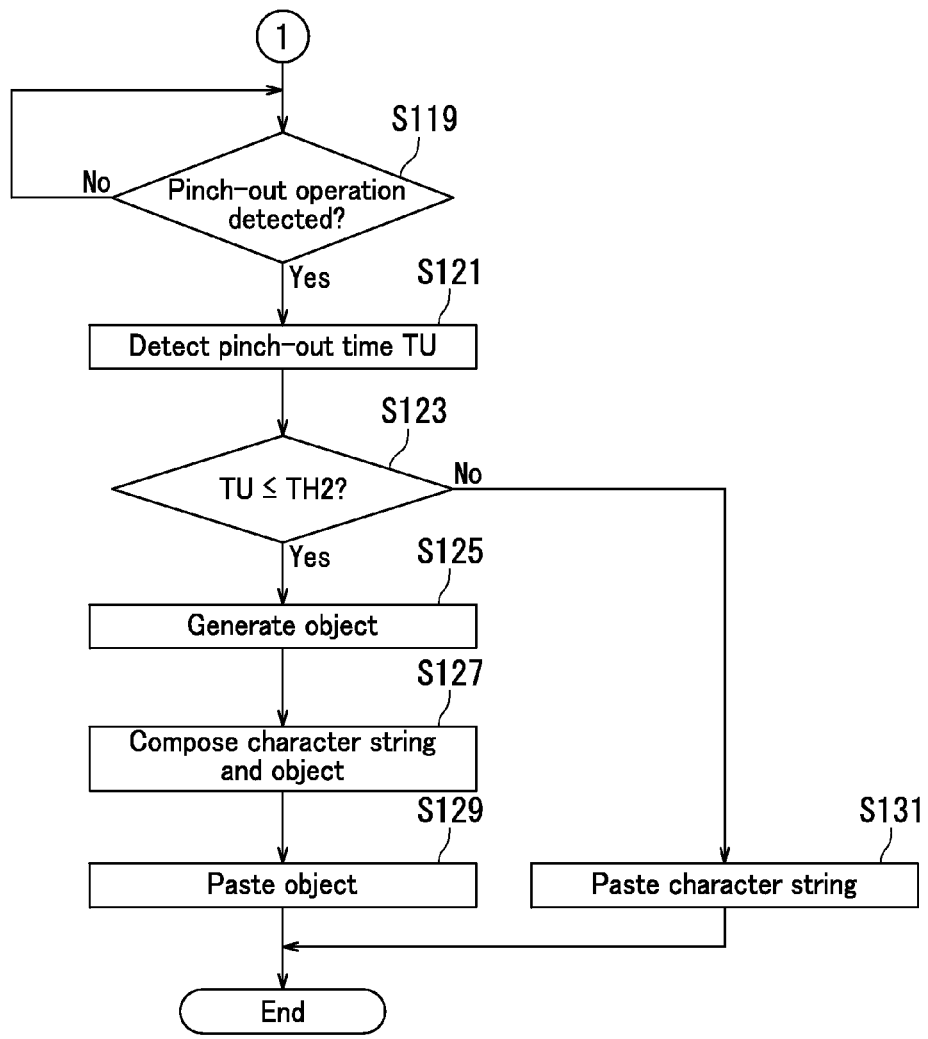
FIG. 4 is a flowchart (second half) illustrating operation of the control section shown in FIG. 2.

The following explains operation of the control section 5 with reference to FIGS. 3 and 4. FIG. 3 is a flowchart (first half) illustrating operation of the control section 5 shown in FIG. 2. FIG. 4 is a flowchart (second half) illustrating operation of the control section 5 shown in FIG. 2. First, as illustrated in FIG. 3, the pinch-in detection section 51 determines whether or not a pinch-in operation is detected (Step S101). A standby state is set when the pinch-in detection section 51 determines that a pinch-in operation is not detected (Step S101: No).

Upon determining that a pinch-in operation is detected (Step S101: Yes), the pinch-in detection section 51 detects a type of an object BJ targeted by the pinch-in operation (Step S103). Next, the copy processing section 52 determines whether or not the type of the object BJ detected in Step S103 is an icon (Step S105). In a situation in which the copy processing section 52 determines that the type of the object BJ is an icon (Step S105: Yes), processing proceeds to Step S111. In a situation in which the copy processing section 52 determines that the type of the object BJ is not an icon (Step S105: No), the pinch-in detection section 51 detects a pinch-in time TN (Step S107). Next, the copy processing section 52 determines whether or not the pinch-in time TN is shorter than or equal to the first threshold time TH1 (Step S109).

In a situation in which the copy processing section 52 determines that the pinch-in time TN is not shorter than or equal to the first threshold time TH1 (i.e., the pinch-in time TN is longer than the first threshold time TH1) (Step S109: No), processing proceeds to Step S113. In a situation in which the copy processing section 52 determines that the pinch-in time TN is shorter than or equal to the first threshold time TH1 (Step S109: Yes), or in a situation in which there is a "Yes" determination in Step S105, the copy processing section 52 copies the object BJ (Step S111). Next, the pinch-out detection section 53 determines whether or not a pinch-out operation is detected (Step S115). A standby state is set when the pinch-out detection section 53 determines that a pinch-out operation is not detected (Step S115: No). Upon the pinch-out detection section 53 determining that a pinch-out operation is detected (Step S115: Yes), the paste processing section 54 pastes the object BJ that was copied in Step S111 at a position at which the pinch-out operation was detected (Step S117) and then processing ends.

In a situation in which there is a "No" determination in Step S109, the copy processing section 52 copies a character string TX included in the object BJ (Step S113). Next, as illustrated in FIG. 4, the pinch-out detection section 53 determines whether or not a pinch-out operation is detected (Step S119). A standby state is set when the pinch-out detection section 53 determines that a pinch-out operation is not detected (Step S119: No). Upon determining that a pinch-out operation is detected (Step S119: Yes), the pinch-out detection section 53 detects a pinch-out time TU (Step S121).

Next, the paste processing section 54 determines whether or not the pinch-out time TU is shorter than or equal to the second threshold time TH2 (Step S123). In a situation in which the paste processing section 54 determines that the pinch-out time TU is not shorter than or equal to the second threshold time TH2 (i.e., the pinch-out time TU is longer than the second threshold time TH2) (Step S123: No), the paste processing section 54 pastes the character string TX at a position at which the pinch-out operation was detected in Step S115 (Step S131) and then processing ends.

In a situation in which the paste processing section 54 determines that the pinch-out time TU is shorter than or equal to the second threshold time TH2 (Step S123: Yes), the paste processing section 54 generates an object BJ (a label in the present embodiment) for pasting the character string TX (Step S125). Next, the paste processing section 54 composes the character string TX copied in Step S113 into the object BJ generated in Step S125 (Step S127). The paste processing section 54 pastes the object BJ composed in Step S127 at a position at which the pinch-out operation was detected in Step S119 (Step S129) and then processing ends.

As explained above with reference to FIGS. 3 and 4, when a pinch-in operation is detected by the pinch-in detection section 51, the copy processing section 52 copies an object BJ or a character string TX included in the object BJ. In addition, when a pinch-out operation is detected by the pinch-out detection section 53, the paste processing section 54 pastes the object BJ or the character string TX included in the object, copied by the copy processing section 52, at a position at which the pinch-out operation is detected. Therefore, it is possible to inhibit operational mistakes from occurring during copying and pasting of the object BJ and the character string TX included in the object BJ.

Although the present embodiment is explained for an example in which an object BJ or a character string TX included in the object BJ is copied when a pinch-in operation is detected, in an alternative example, the object BJ or the character string TX included in the object BJ may be cut when the pinch-in operation is detected. In such a configuration, it is possible to inhibit operational mistakes from occurring during cutting and pasting of the object BJ and the character string TX included in the object BJ.

Figure 5:
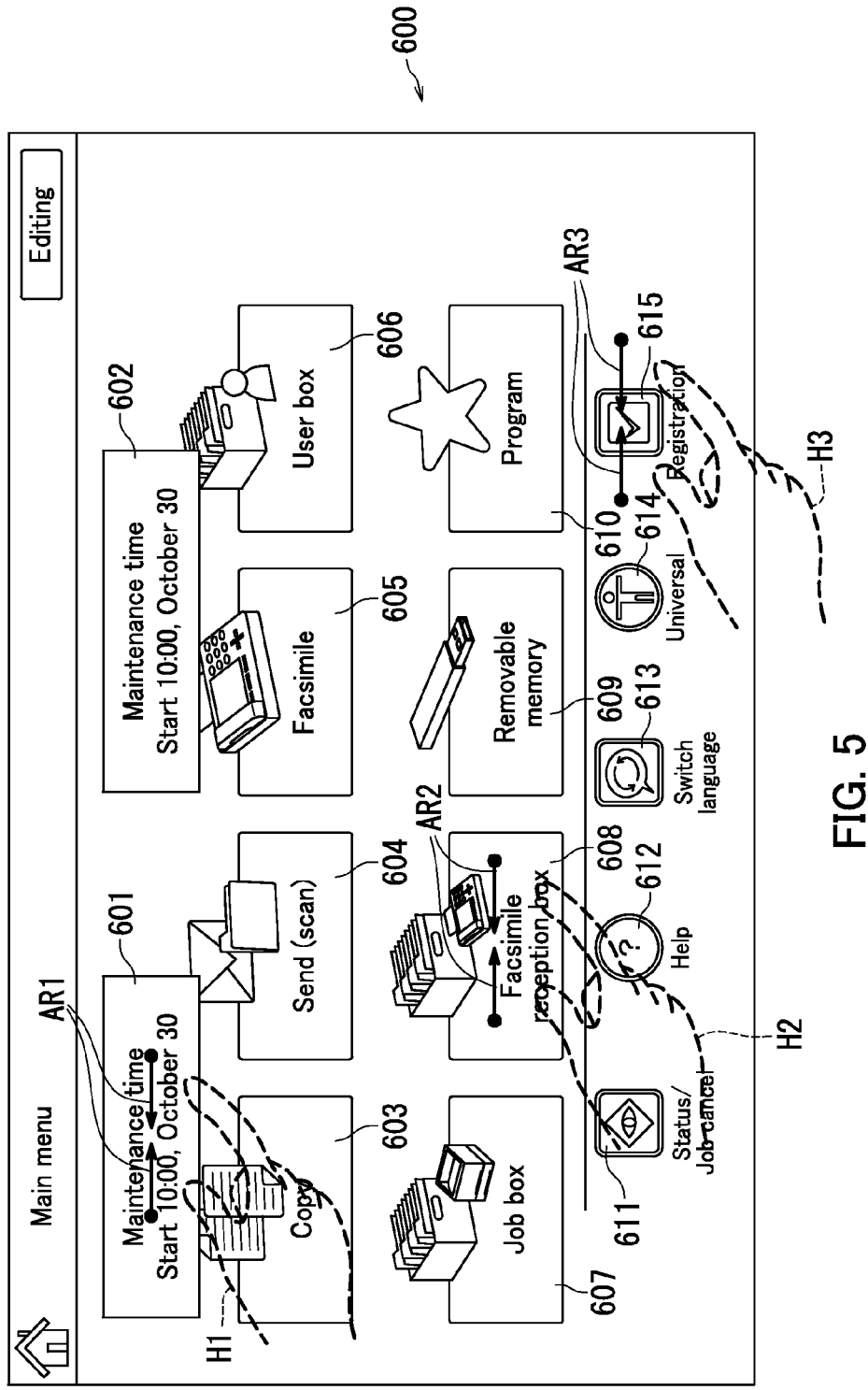
FIG. 5 is a screen diagram illustrating examples of a pinch-in operation shown in Step S101 of FIG. 3.

The following explains an example of copy processing and paste processing by the control section 5 with reference to FIGS. 5, 6, 7A, 7B, 8A-8C, 9A, and 9B. Copy processing by the control section 5 is first explained with reference to FIGS. 5 and 6. FIG. 5 is a screen diagram 600 illustrating examples (fast pinch-in operations) of the pinch-in operation shown in Step S101 of FIG. 3.

The screen diagram 600 shows label objects 601 and 602, button objects 603-610, and icon objects 611-615. Arrows AR1, AR2, and AR3 respectively indicate pinch-in operations performed on the label object 601, the button object 608, and the icon object 615. A black circular mark ● at one end of each of the arrows AR1, AR2, and AR3 indicates the position of a finger when initiating the pinch-in operation and an opposite end of each of the arrows AR1, AR2, and AR3 (tip of the arrow) indicates the position of the finger when completing the pinch-in operation. Solid arrows indicate a fast pinch-in operation.

Hands H1, H2, and H3 are shown performing pinch-in operations respectively on the label object 601, the button object 608, and the icon object 615. It should be noted that the hands H1, H2, and H3 and the arrows AR1, AR2, and AR3 are not actually displayed on the screen of the touch panel 41.

In a situation in which the hand H1 performs a fast pinch-in operation on the label object 601 as illustrated in FIG. 5, the copy processing section 52 copies the label object 601. In a situation in which the hand H2 performs a fast pinch-in operation on the button object 608, the copy processing section 52 copies the button object 608. In a situation in which the hand H3 performs a fast pinch-in operation on the icon object 615, the copy processing section 52 copies the icon object 615.

Figure 6:
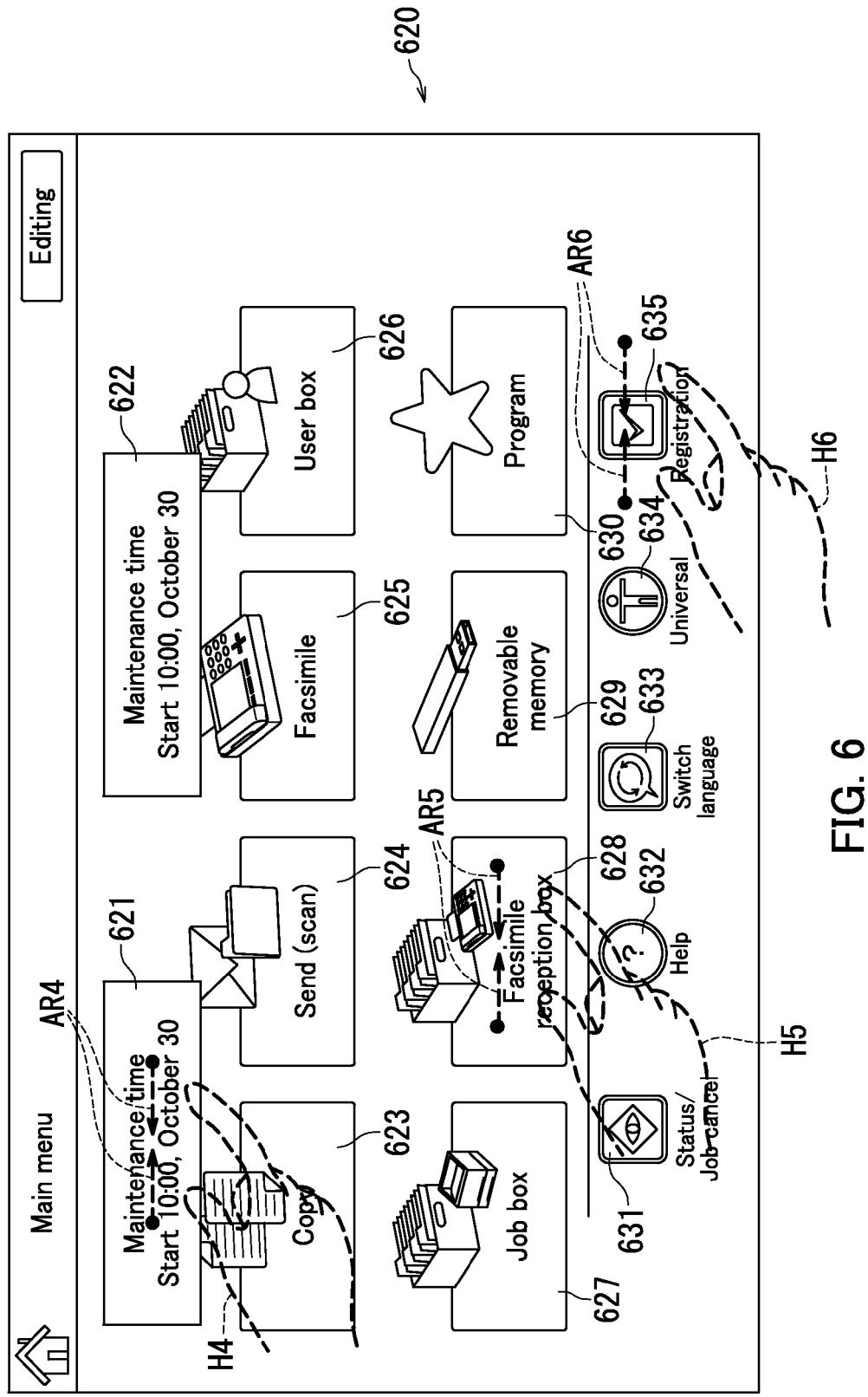
FIG. 6 is a screen diagram illustrating other examples of the pinch-in operation shown in Step S101 of FIG. 3.

FIG. 6 is a screen diagram 620 illustrating examples (slow pinch-in operations) of the pinch-in operation shown in Step S101 of FIG. 3.

The screen diagram 620 in FIG. 6 shows label objects 621 and 622, button objects 623-630, and icon objects 631-635. Arrows AR4, AR5, and AR6 respectively indicate pinch-in operations performed on the label object 621, the button object 628, and the icon object 635. A black circular mark ● at one end of each of the arrows AR4, AR5, and AR6 indicates the position of a finger when initiating the pinch-in operation and an opposite end of each of the arrows AR4, AR5, and AR6 (tip of the arrow) indicates the position of the finger when completing the pinch-in operation. Dashed arrows indicate a slow pinch-in operation.

Hands H4, H5, and H6 are shown performing pinch-in operations respectively on the label object 621, the button object 628, and the icon object 635. It should be noted that the hands H4, H5, and H6 and the arrows AR4, AR5, and AR6 are not actually displayed on the screen of the touch panel 41.

In a situation in which the hand H4 performs a slow pinch-in operation on the label object 621 as illustrated in FIG. 6, the copy processing section 52 copies a character string TX included in the label object 621. The character string TX is more specifically a character string TX that reads "Maintenance time, start 10:00, October 30." In a situation in which the hand H5 performs a slow pinch-in operation on the button object 628, the copy processing section 52 copies a character string TX included in the button object 628. The character string TX is more specifically a character string TX that reads "Facsimile reception box." In a situation in which the hand H6 performs a slow pinch-in operation on the icon object 635, the copy processing section 52 copies the icon object 635.

Figure 7A:
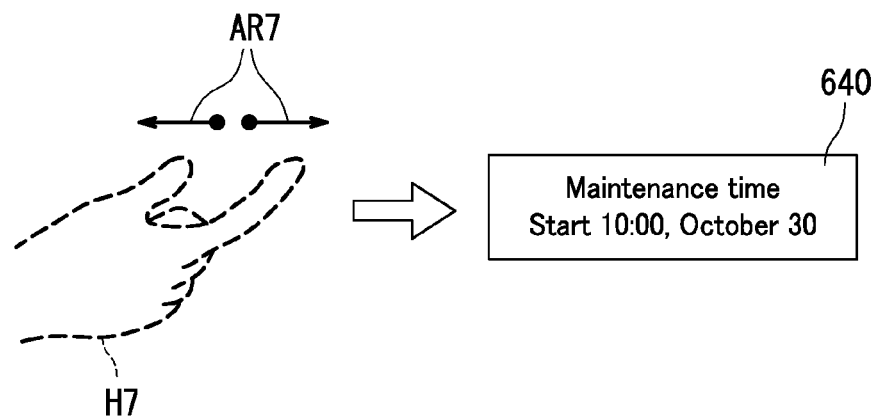
Figure 7B:
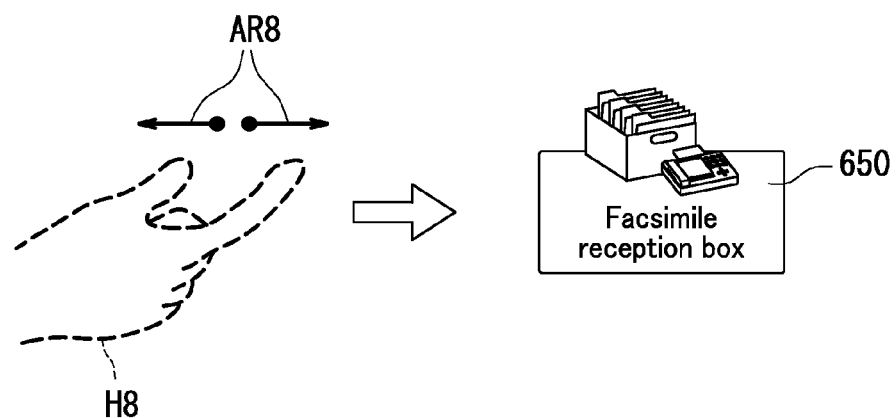

The following explains paste processing with reference to FIGS. 7A, 7B, 8A-8C, 9A and 9B. FIGS. 7A and 7B each illustrate an example (fast pinch-out operation) of the pinch-out operation shown in Step S115 of FIG. 3. FIG. 7A illustrates an example in which the pinch-out operation is for performing paste processing of the label object 601 shown in FIG. 5. FIG. 7B illustrates an example in which the pinch-out operation is for performing paste processing of the button object 608 shown in FIG. 5.

Arrows AR7 and AR8 that are shown on the respective left-hand sides of FIGS. 7A and 7B indicate the pinch-out operations. A black circular mark ● at one end of each of the arrows AR7 and AR8 indicates the position of a finger when initiating the pinch-out operation and an opposite end of each of the arrows AR7 and AR8 (tip of the arrow) indicates the position of the finger when completing the pinch-out operation. Solid arrows indicate a fast pinch-out operation.

Hands H7 and H8 shown on the respective left-hand sides of FIGS. 7A and 7B are performing the pinch-out operations on the touch panel 41. It should be noted that the hands H7 and H8 and the arrows AR7 and AR8 are not actually displayed on the screen of the touch panel 41.

In a situation in which the hand H7 performs a fast pinch-out operation, the paste processing section 54 pastes the label object 601, copied in FIG. 5, at a position at which the pinch-out operation is performed, such that a label object 640 is displayed on the screen of the touch panel 41 as illustrated on the right-hand side of FIG. 7A. In a situation in which the hand H8 performs a fast pinch-out operation, the paste processing section 54 pastes the button object 608, copied in FIG. 5, at a position at which the pinch-out operation is performed, such that a button object 650 is displayed on the screen of the touch panel 41 as illustrated on the right-hand side of FIG. 7B.

Figure 8A:
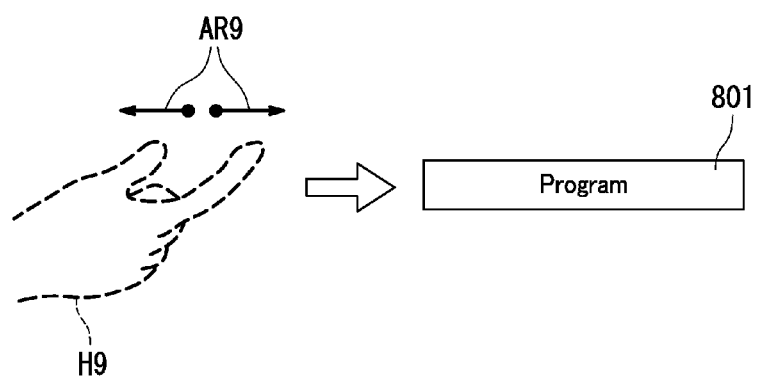
Figure 8B:
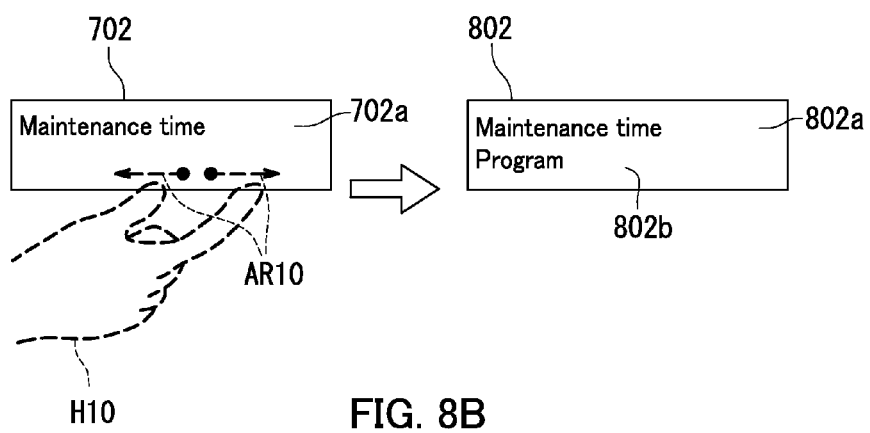
Figure 8C:
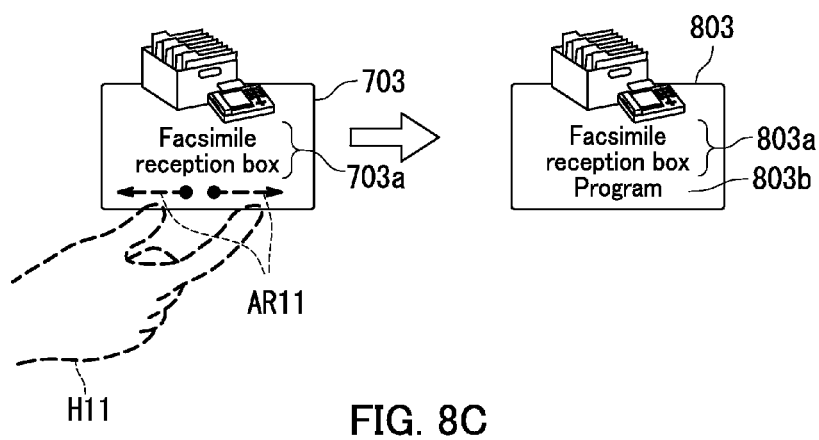

FIGS. 8A, 8B, and 8C illustrate examples of the pinch-out operation shown in Step S119 of FIG. 4. FIG. 8A illustrates an example in which the pinch-out operation is for performing paste processing of a label object. FIG. 8B illustrates an example in which the pinch-out operation is for performing paste processing of text into a label object 702. FIG. 8C illustrates an example in which the pinch-out operation is for performing paste processing of text into a button object 703. The pinch-out operations shown in FIGS. 8A, 8B, and 8C are for example each performed after a character string TX reading "Program" has been copied through a pinch-in operation by the hand H5 on the button object 630 in FIG. 6.

Arrows AR9 on the left-hand side of FIG. 8A indicate the pinch-out operation. A black circular mark ● at one end of each of the arrows AR9 indicates the position of the user's finger when initiating the pinch-out operation and an opposite end of each of the arrows AR9 (tip of the arrow) indicates the position of the finger when completing the pinch-out operation. Solid arrows indicate a fast pinch-out operation. A hand H9 shown on the left-hand side of FIG. 8A is performing the pinch-out operation on the touch panel 41. It should be noted that the hand H9 and the arrows AR9 are not actually displayed on the touch panel 41.

In a situation in which the hand H9 performs a fast pinch-out operation, the paste processing section 54 pastes a label object 801 including the copied character string TX reading "Program" at a position at which the pinch-out operation is performed.

Arrows AR10 and AR11 that are shown on the respective left-hand sides of FIGS. 8B and 8C indicate the pinch-out operations. A black circular mark ● at one end of each of the arrows AR10 and AR11 indicates the position of a finger when initiating the pinch-out operation and an opposite end of each of the arrows AR10 and AR11 (tip of the arrow) indicates the position of the finger when completing the pinch-out operation. Dashed arrows indicate a slow pinch-out operation.

A hand H10 shown on the left-hand side of FIG. 8B is performing the pinch-out operation below a character string 702a included in a label object 702 that is displayed on the touch panel 41. A hand H11 shown on the left-hand side of FIG. 8C is performing the pinch-out operation below a character string 703a included in a button object 703 that is displayed on the touch panel 41. It should be noted that the hands H10 and H11 and the arrows AR10 and AR11 are not actually displayed on the touch panel 41.

In a situation in which the hand H10 performs a slow pinch-out operation, the paste processing section 54 pastes the copied character string "Program" within the label object 702 at a position at which the pinch-out operation is performed, as illustrated on the right-hand side of FIG. 8B. As a result, a label object 802 that is composed of the label object 702 and the character string "Program" is pasted and displayed on the screen of the touch panel 41. The label object 802 includes a character string 802a corresponding to a character string 702a "Maintenance time" that is included in the label object 702 and a character string 802b "Program" that is displayed below the character string 802a.

In a situation in which the hand H11 performs a slow pinch-out operation, the paste processing section 54 pastes the copied character string "Program" within the button object 703 at a position at which the pinch-out operation is performed, as illustrated on the right-hand side of FIG. 8C. As a result, a button object 803 that is composed of the button object 703 and the character string "Program" is pasted and displayed on the touch panel 41. The button object 803 includes a character string 803a corresponding to a character string 703a "Facsimile reception box" that is included in the button object 703 and a character string 803b "Program" that is displayed below the character string 803a.

Figure 9A:
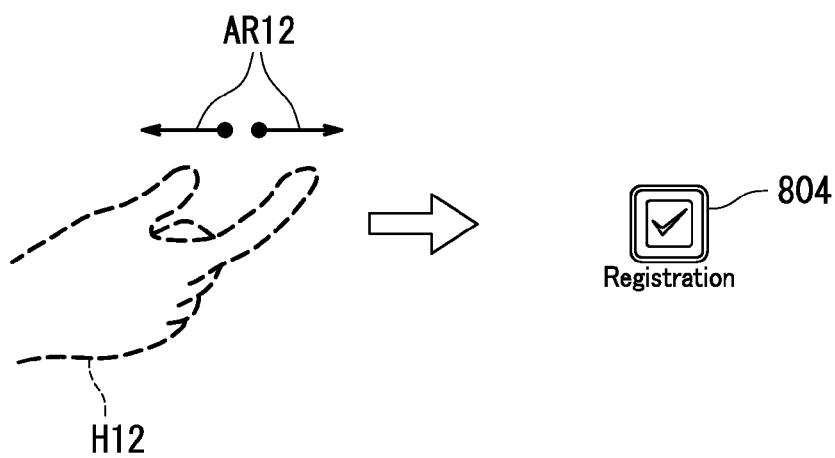
Figure 9B:
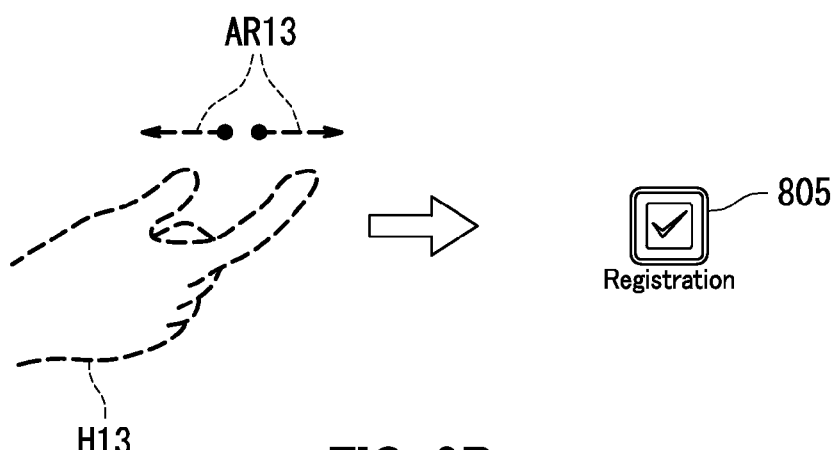

FIGS. 9A and 9B illustrate other examples of the pinch-out operation shown in Step S115 of FIG. 3. FIG. 9A illustrates an example of a fast pinch-out operation for performing paste processing of an icon object. FIG. 9B illustrates an example of a slow pinch-out operation for performing paste processing of an icon object. Arrows AR12 and AR13 that are shown on the respective left-hand sides of FIGS. 9A and 9B indicate the pinch-out operations. A black circular mark ● at one end of each of the arrows AR12 and AR13 indicates the position of a finger when initiating the pinch-out operation and an opposite end of each of the arrows AR12 and AR13 (tip of the arrow) indicates the position of the finger when completing the pinch-out operation. The solid arrows in FIG. 9A indicate a fast pinch-out operation and the dashed arrows in FIG. 9B indicate a slow pinch-out operation.

Hands H12 and H13 shown on the respective left-hand sides of FIGS. 9A and 9B are performing the pinch-out operations on the touch panel 41. It should be noted that the hands H12 and H13 and the arrows AR12 and AR13 are not actually displayed on the touch panel 41.

In a situation in which the hand H12 performs a fast pinch-out operation, the paste processing section 54 pastes a copied icon object 804 at a position at which the pinch-out operation is performed and displays the icon object 804 on the screen of the touch panel 41, as illustrated on the right-hand side of FIG. 9A.

In a situation in which the hand H13 performs a slow pinch-out operation, the paste processing section 54 pastes a copied icon object 805 at a position at which the pinch-out operation is performed and displays the icon object 805 on the screen of the touch panel 41, as illustrated on the right-hand side of FIG. 9B.

Through the above, an embodiment of the present disclosure has been explained with reference to the drawings. However, the present disclosure is of course not limited to the above embodiment and can be implemented in various different forms without deviating from the general theme of the present disclosure (for example, as explained below in sections (1) to (3)). In order to facilitate understanding, the drawings illustrate elements of configuration schematically and properties of the elements of configuration in the drawings, such as thickness, length, and quantity, may differ from reality in order to aid preparation of the drawings. Shapes, dimensions, etc. of the elements of configuration given in the above embodiment are merely examples that do not impart any particular limitations and may be altered in various ways, so long as such alterations do not substantially deviate from the configuration of the present disclosure.

(1) Although the present embodiment is explained for an example in which the electronic device is an image forming apparatus, the electronic device may be any electronic device that includes a touch panel. For example, the electronic device may be a smartphone, a tablet computer, a CD player, a DVD player, and various household electrical appliances.

(2) Although the present embodiment is explained for an example in which the paste processing section 54 determines a pasting target based on the pinch-out time TU, in an alternative example, a paste processing section may determine a pasting target based on a position at which a pinch-out operation is performed. More specifically, the paste processing section may paste a character string in a situation in which the pinch-out operation is performed within an object and may paste an object in a situation in which a pinch-out operation is performed in a position other than within an object. Such a configuration can improve usability.

(3) Although the present embodiment is explained for an example in which each object BJ is an icon, a button, or a label, in an alternative example, objects BJ may include objects other than icons, buttons, and labels. For example, objects BJ may include one or more of a folder, a shortcut, and a widget (gadget).

What is claimed is:

1. An electronic device comprising:
   a touch panel;
   a pinch-in detection section that detects a pinch-in operation performed by a user on an object displayed on the touch panel;
   a copy processing section that when the pinch-in operation is detected by the pinch-in detection section, copies the object or a character string included in the object;
   a pinch-out detection section that detects a pinch-out operation performed by the user on the touch panel; and
   a paste processing section that when the pinch-out operation is detected by the pinch-out detection section, pastes the object or the character string, copied by the copy processing section, at a position at which the pinch-out operation is detected, wherein
   the pinch-in detection section detects a type of the object that is targeted by the pinch-in operation,
   the copy processing section determines a copying target based on the type of the object,
   the copy processing section
      determines that the copying target is the object in a situation in which the type of the object is an icon, and
      determines that the copying target is the object or the character string included in the object in a situation in which the type of the object is not an icon.

2. The electronic device according to claim 1, wherein
   the pinch-in detection section detects a pinch-in time indicating a length of time from initiation of the pinch-in operation until completion of the pinch-in operation, and
   the copy processing section determines the copying target based on the pinch-in time.

3. The electronic device according to claim 2, wherein
the copy processing section
  copies the object in a situation in which the pinch-in time is shorter than or equal to a preset first threshold time, and
  copies the character string included in the object in a situation in which the pinch-in time is longer than the first threshold time.

4. The electronic device according to claim 1, wherein the paste processing section determines a pasting target based on the type of the object.

5. The electronic device according to claim 4, wherein the paste processing section
  determines that the pasting target is the object in a situation in which the type of the object is an icon, and
  determines that the pasting target is the object or the character string included in the object in a situation in which the type of the object is not an icon.

6. The electronic device according to claim 1, wherein
the pinch-out detection section detects a pinch-out time indicating a length of time from initiation of the pinch-out operation until completion of the pinch-out operation, and
the paste processing section determines a pasting target based on the pinch-out time.

7. The electronic device according to claim 6, wherein
in a state in which the character string included in the object has been copied by the copy processing section, the paste processing section
  generates and pastes an object of a preset type including the character string in a situation in which the pinch-out time is shorter than or equal to a preset second threshold time, and
  pastes the character string in a situation in which the pinch-out time is longer than the second threshold time.

8. The electronic device according to claim 7, wherein
in the state in which the character string included in the object has been copied by the copy processing section,
the paste processing section, in the situation in which the pinch-out time is shorter than or equal to the second threshold time,
  selects a type of object based on an operation by the user, and
  generates and pastes an object of the selected type including the character string.

9. The electronic device according to claim 6, wherein
in a state in which the object has been copied by the copy processing section,
the paste processing section
  pastes the object in a situation in which the pinch-out time is shorter than or equal to a preset second threshold time, and
  pastes the character string included in the object in a situation in which the pinch-out time is longer than the preset second threshold time.

10. The electronic device according to claim 1, wherein
the pinch-out detection section detects a position at which the pinch-out operation is performed, and
the paste processing section determines a pasting target based on the position at which the pinch-out operation is performed.

11. An electronic device comprising:
a touch panel;
a pinch-in detection section that detects a pinch-in operation performed by a user on an object displayed on the touch panel;
a cut processing section that when the pinch-in operation is detected by the pinch-in detection section, cuts the object or a character string included in the object;
a pinch-out detection section that detects a pinch-out operation performed by a user on the touch panel; and
a paste processing section that when the pinch-out operation is detected by the pinch-out detection section, pastes the object or the character string, cut by the cut processing section, at a position at which the pinch-out operation is detected, wherein
the pinch-in detection section detects a type of the object that is targeted by the pinch-in operation,
the cut processing section determines a cutting target based on the type of the object,
the cut processing section
  determines that the cutting target is the object in a situation in which the type of the object is an icon, and
  determines that the cutting target is the object or the character string included in the object in a situation in which the type of the object is not an icon.

12. An operation method for a touch panel comprising:
detecting a pinch-in operation performed by a user on an object displayed on the touch panel;
copying the object or a character string included in the object when the pinch-in operation is detected;
detecting a pinch-out operation performed by the user on the touch panel; and
pasting the copied object or the copied character string when the pinch-out operation is detected at a position at which the pinch-out operation is detected;
detecting a type of the object that is targeted by the pinch-in operation;
determining a copying target based on the type of the object;
determining that the copying target is the object in a situation in which the type of the object is an icon; and
determining that the copying target is the object or the character string included in the object in a situation in which the type of the object is not an icon.

* * * * *